United States Patent
Schoor et al.

(10) Patent No.: US 11,650,284 B2
(45) Date of Patent: May 16, 2023

(54) RADAR SENSOR SYSTEM AND METHOD FOR OPERATING A RADAR SENSOR SYSTEM

(71) Applicant: Robert Bosch GmbH, Stuttgart (DE)

(72) Inventors: Michael Schoor, Stuttgart (DE); Benedikt Loesch, Stuttgart (DE); Marcel Mayer, Lonsee (DE)

(73) Assignee: ROBERT BOSCH GMBH, Stuttgart (DE)

(*) Notice: Subject to any disclaimer, the term of this patent is extended or adjusted under 35 U.S.C. 154(b) by 168 days.

(21) Appl. No.: 16/962,145

(22) PCT Filed: Dec. 14, 2018

(86) PCT No.: PCT/EP2018/084878
§ 371 (c)(1),
(2) Date: Jul. 14, 2020

(87) PCT Pub. No.: WO2019/158249
PCT Pub. Date: Aug. 22, 2019

(65) Prior Publication Data
US 2020/0408877 A1    Dec. 31, 2020

(30) Foreign Application Priority Data
Feb. 15, 2018    (DE) .......................... 102018202296.8

(51) Int. Cl.
*G01S 7/03*    (2006.01)
*H01Q 21/00*    (2006.01)
(Continued)

(52) U.S. Cl.
CPC ........... *G01S 7/03* (2013.01); *H01Q 21/0025* (2013.01); *G01S 7/4004* (2013.01); *G01S 13/42* (2013.01);
(Continued)

(58) Field of Classification Search
CPC .......... G01S 7/03; G01S 13/931; G01S 13/87; G01S 13/42; G01S 7/4004; H01Q 21/0025; H01Q 1/3233
See application file for complete search history.

(56) References Cited

U.S. PATENT DOCUMENTS

2002/0067287 A1    6/2002    Delcheccolo et al.
2014/0035780 A1    2/2014    Trotta
(Continued)

FOREIGN PATENT DOCUMENTS

CN    102445693 A    5/2012
DE    102014213171 A1    10/2015
(Continued)

OTHER PUBLICATIONS

International Search Report for PCT/EP2018/084878, dated Apr. 3, 2019.
(Continued)

*Primary Examiner* — Timothy A Brainard
*Assistant Examiner* — Ismaaeel A. Siddiquee
(74) *Attorney, Agent, or Firm* — Norton Rose Fulbright US LLP; Gerard Messina

(57) ABSTRACT

A radar sensor system and a method for operating a radar sensor system. The radar sensor system includes: at least one first sub-sensor system and a second sub-sensor system, each for generating sensor data, each sub-sensor system including an antenna array including at least one receiving antenna and at least one transmitting antenna; a control device, by which each sub-sensor system is independently transferrable from a normal operation into a silent operation; and a data fusion device, which is designed to fuse the sensor data exclusively of the sub-sensor systems during the normal operation with one another for generating output data.

10 Claims, 4 Drawing Sheets

(51) Int. Cl.
*G01S 13/931* (2020.01)
*H01Q 1/32* (2006.01)
*G01S 13/42* (2006.01)
*G01S 13/87* (2006.01)
*G01S 7/40* (2006.01)

(52) U.S. Cl.
CPC .............. *G01S 13/87* (2013.01); *G01S 13/931* (2013.01); *H01Q 1/3233* (2013.01)

(56) References Cited

U.S. PATENT DOCUMENTS

| | | | | |
|---|---|---|---|---|
| 2015/0330792 | A1* | 11/2015 | Stählin | G01C 21/165 |
| | | | | 701/479 |
| 2017/0285165 | A1 | 10/2017 | Khlifi | |
| 2017/0292898 | A1* | 10/2017 | Schweikert | F02D 41/26 |
| 2018/0136660 | A1* | 5/2018 | Mudalige | G01S 13/865 |
| 2019/0204083 | A1* | 7/2019 | Felice | G01C 25/00 |
| 2019/0204435 | A1* | 7/2019 | Poiger | G01S 13/878 |
| 2019/0258251 | A1* | 8/2019 | Ditty | G06V 20/588 |
| 2021/0362740 | A1* | 11/2021 | Mujica | B60W 60/001 |
| 2022/0080992 | A1* | 3/2022 | Yousuf | G06F 11/182 |

FOREIGN PATENT DOCUMENTS

| | | |
|---|---|---|
| DE | 102014009869 A1 | 1/2016 |
| DE | 102014014307 A1 | 3/2016 |
| JP | H0584884 U | 11/1993 |
| JP | 2001203531 A | 7/2001 |
| JP | 2002277533 A | 9/2002 |
| JP | 2004085337 A | 3/2004 |
| JP | 2010122051 A | 6/2010 |
| JP | 2011191293 A | 9/2011 |
| JP | 2016038689 A | 3/2016 |

OTHER PUBLICATIONS

Hall, D. L. et al., "An Introduction to Multisensor Data Fusion," Proceedings of IEEE, vol. 85, No. 1, 1997, pp. 6-23.

* cited by examiner

RADAR SENSOR SYSTEM AND METHOD FOR OPERATING A RADAR SENSOR SYSTEM

FIELD

The present invention relates to a radar sensor system, in particular, for a motor vehicle or in a motor vehicle, and to a method for operating a radar sensor system, in particular, for a motor vehicle or in a motor vehicle. The motor vehicle is preferably a passenger car or a truck.

BACKGROUND INFORMATION

Radar sensors are increasingly used in a plurality of applications. In particular, in vehicles, such as automobiles, additional sensors are to assume a growing number of tasks, in particular, in the context of automated or assisted driving. In addition to the performance of a radar sensor during normal operation, additional requirements exist with regard to availability of the sensor.

When a radar sensor, in existing driver assistance applications, showed an error, a consolidated state, or also an "emergency operation," was frequently achieved by the entire radar sensor terminating the communication to the outside, for example a communication with a bus, e.g., a vehicle bus. When here and hereafter mention is made of errors, this shall, in particular, be understood to mean so-called E/E errors according to the ISO 26262 standard.

For example, German Patent Application No. DE 10 2014 213 171 A1 describes a system for autonomous vehicle guidance and a corresponding motor vehicle.

Considerable requirements exist for radar sensors with respect to keeping the probability for a failure low. According to the ISO 26262 standard, the probability for a failure of a component is determined in a unit named FIT ("failure in time"), 1 FIT denoting one error in $10^9$ hours, or $10^{-9}$ errors per hour.

In the case of the ASIL-B or ASIL-C (Automotive Safety Integrity Level, also defined in ISO 26262) safety levels, for example, a component is allowed to have a maximum of 100 FIT, components not being taken into consideration which are in a silent operation, in which the component no longer carries out any communication whatsoever and is thus in a safe state. In this silent operation, the component thus cannot result in or contribute to unfavorable or undesirable decisions.

For example, a choke of a switching regulator is indicated having 38 FIT. In general, at least two such chokes are used to operate a microcontroller, whereby a budget of 100 FIT would already largely be exhausted at a rate of 76%, even if all other components had a FIT value of 0.

SUMMARY

It is desirable to provide a radar sensor system and a method for operating a radar sensor system, which allow a reliable output of radar data even if errors, unexpected events and unknown states occur.

The present invention provides a radar sensor system and a method.

In accordance with an example embodiment of the present invention, a radar sensor system is provided, including: at least one first sub-sensor system and a second sub-sensor system, each for generating sensor data, each sub-sensor system including an antenna array including at least one receiving antenna and at least one transmitting antenna; a control device, by which each sub-sensor system may be independently transferred from a normal operation into a silent operation; and a data fusion device, which is designed to fuse the sensor data exclusively of the sub-sensor systems during normal operation with one another for generating output data.

In other words, it may be provided that in each case only those sensor data whose sub-sensor systems are in the normal operation, i.e., have not been transferred into the silent operation, contribute to the generation of the output data. In other words, the silent operation may be defined, e.g., in that the sensor data of sub-sensor systems in the silent operation do not contribute to the generation of the output data. The normal operation of each sub-sensor system can accordingly be defined in that the sensor data of the sub-sensor system in the normal operation are used for generating output data, in particular, are fused with the sensor data of the other sub-sensor systems in the normal operation.

It may be provided that one or multiple sub-sensor system(s) may be transferred from the silent operation back into the normal operation when certain conditions are present, in particular, that one or multiple sub-sensor system(s) may be switched back and forth between normal operation and silent operation. When a sub-sensor system has been transferred from the silent operation back into the normal operation, the sensor data of this sub-sensor system will accordingly also be used again to generate the output data, e.g., be fused with the sensor data of other sub-sensor systems in the normal operation.

The emergency operating mode of a radar sensor system thus represents a consolidated state in which the sensor data of this sub-sensor system cannot have any negative effects on the output data, i.e., on the overall result of the radar sensor system. In this way, for example, a FIT value of considerably less than 100 may be achieved for the radar sensor system in that the sub-sensor systems in fact have higher FIT values, but they are disregarded in the overall consideration since each sub-sensor system, in the silent operation, no longer has any effect on the output data.

The control device may, in particular, be designed in such a way that it identifies errors in the individual sub-sensor systems, or receives a signal indicating an error in individual sub-sensor systems, and transfers each sub-sensor system into the silent operation in which it identified an error or in which an error was indicated. The control device may also be designed in such a way that it establishes that an error no longer occurs in a sub-sensor system, or receives a corresponding signal which indicates this, and, based thereon, transfers the corresponding sub-sensor system back into the normal operation.

According to the present invention, an availability of output data of the sensor system may be considerably increased. A failure rate of the overall radar sensor system may already be considerably reduced even if only two sub-sensor systems are present. Such a total failure of the radar sensor system may namely be present at the most when an error occurs which affects all sub-sensor systems, or when all sub-sensor systems are affected by errors independently of one another, which is unlikely.

The reduced failure rate overall results in a high availability of all those output data which may already be detected by a single sub-sensor system. In the best case, the radar sensor system will use the sensor data of all sub-sensor systems, in particular, fuse these with one another, for generating the output data. However, even in an error, the radar sensor system will still use the sensor data of N−1 sub-sensor systems to generate the output data in the case of a radar sensor system including N sub-sensor systems and an error in one of these N sub-sensor systems.

An operation of the radar sensor system in which not all N sub-sensor systems are presently used for generating the output data may be referred to as an emergency operation of the radar sensor system. During the emergency operation, the radar sensor system may possibly not reach the full performance, but still a considerable portion, e.g., 50%, of the full performance. Such an emergency operation may be used, for example, to bring the vehicle or the device equipped with the radar sensor system into a secured state.

For example, a vehicle including such a radar sensor system may be steered to a halt along the roadside or in a repair shop. However, it is also possible that a vehicle including the radar sensor system is controlled to carry out a rapid halt on the instantaneous traffic lane. The respective secured state into which the device or the vehicle including the radar sensor system is transferred may depend on the number of failed sub-sensor systems, i.e., transferred into the silent operation. In other words, the secured state may encompass a measure which takes effect in a shorter term, or may be sought more quickly, the more of the sub-sensor systems were transferred into the silent operation.

The present invention thus also provides a device, in particular, a vehicle, which includes the radar sensor system according to the present invention and which is transferrable into a secured state, e.g., is steerable into a safe position, as a function of the output data of the radar sensor system.

Furthermore, in accordance with an example embodiment of the present invention, a method is provided, including the steps: receiving sensor data of a first sub-sensor system of a radar sensor system; receiving sensor data of a second sub-sensor system of the radar sensor system; transferring at least one of the sub-sensor systems, independently of the other sub-sensor systems, from a normal operation into a silent operation; fusing the sensor data exclusively of those sub-sensor systems which are in the normal operation for generating output data; and outputting the generated output data.

Further specific embodiments and refinements are derived from the description with reference to the figures.

According to one preferred refinement of the present invention, the radar sensor system includes a clock generator, which provides a shared clock signal to the sub-sensor systems. The fusion of the sensor data for generating the output data advantageously takes place using the clock signal. In this way, a synchronization of the sensor data may be achieved or improved.

Accordingly, the example method according to the present invention may also encompass a step of providing a shared clock signal to the sub-sensor systems, and provide that the fusion of the sensor data takes place using the shared clock signal.

According to another advantageous refinement of the present invention, the data fusion device is designed to fuse the sensor data generated by the sub-sensor systems at a raw data-near level.

In the scientific paper by Hall, D. L. and Llinas, J.: "An introduction to multisensor data fusion," in "Proceedings of IEEE Vol. 85, 1997," pp. 6-23, a system for classifying data levels is described. Accordingly, the raw sensor data may be fused with one another during the so-called "data fusion" prior to further signal processing steps, such as during the noise suppression with the aid of beamforming. An extraction of unambiguous features takes place prior to the fusion during the so-called "feature fusion." The newly combined feature vectors are subsequently further processed, e.g., in an audiovisual speech recognition in which the acoustic and visual feature vectors are combined, to achieve acceptable recognition rates, even in loud surroundings or in the case of disrupted channels, by combining speech sounds and lip movements. During the so-called "decision fusion," the combination only takes place after all signal processing and pattern recognition steps have been carried out.

According to another advantageous refinement of the present invention, the data fusion device is designed to fuse the sensor data generated by the sub-sensor systems at a raw data level or on a spectra level.

According to another advantageous refinement of the present invention, the control device is designed as a multitude of control units. Advantageously, each sub-sensor system is assigned at least one of the control units for transferring the particular sub-sensor system into the silent operation.

According to another advantageous refinement of the present invention, the control units are designed as microcontrollers.

According to another advantageous refinement of the present invention, the data fusion device includes a data interface between at least two of the multitude of control units.

According to another advantageous refinement of the present invention, the control device includes a central control unit for at least two of the sub-sensor systems or is made up of such a central control unit for all sub-sensor systems.

According to another advantageous refinement of the present invention, the antenna arrays of at least two sub-sensor systems are situated point-symmetrically, axially symmetrically and/or rotation-symmetrically with respect to one another.

According to another advantageous refinement of the present invention, each sub-sensor system includes a dedicated independent voltage supply unit, which is feedable electrical energy via a shared plug connector of the radar sensor system.

BRIEF DESCRIPTION OF THE DRAWINGS

The present invention is described in greater detail hereafter based on the exemplary embodiments shown in the schematic figures.

Figure 1:
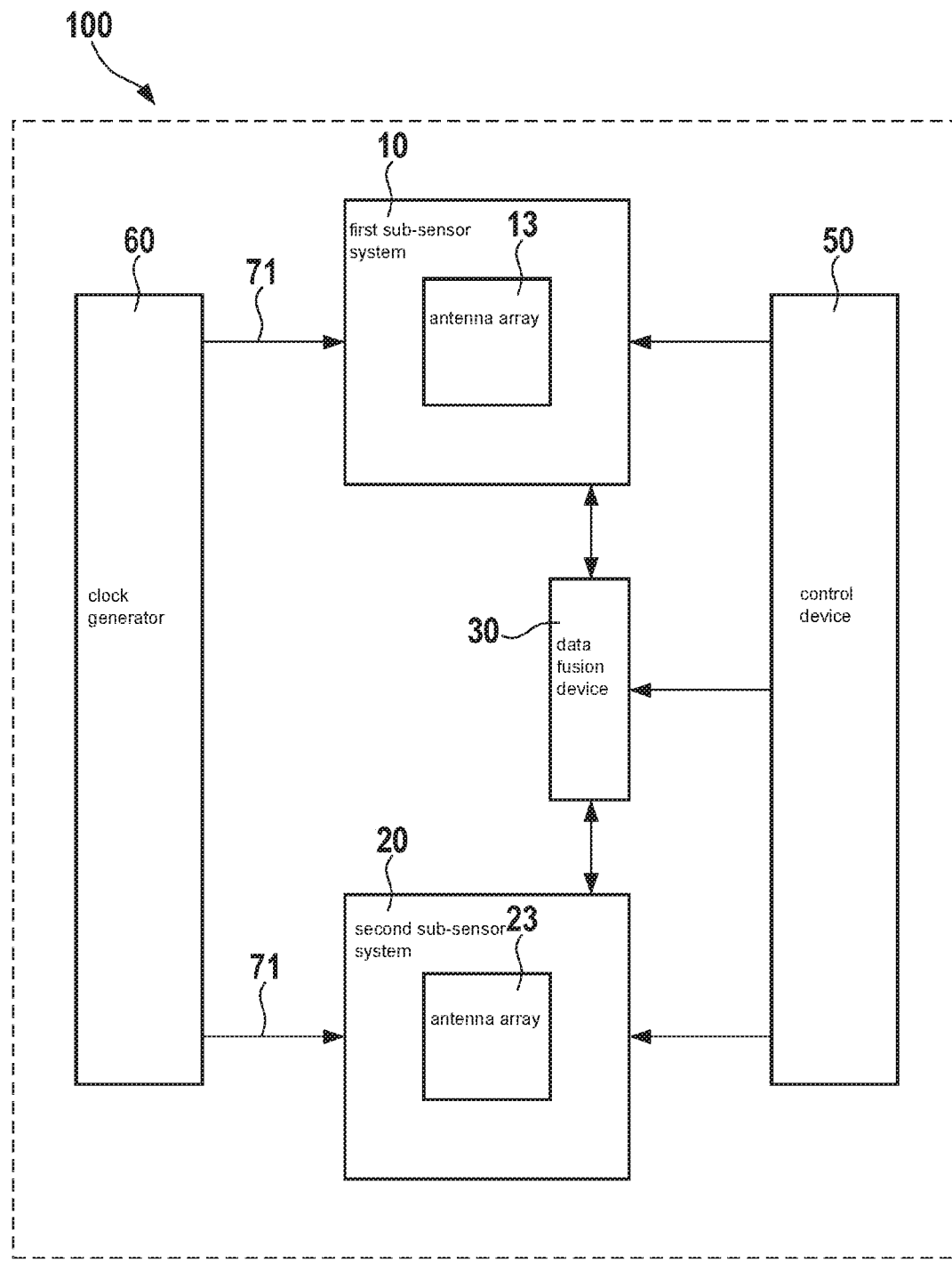
FIG. 1 shows a schematic block diagram of a radar sensor system according to one specific embodiment of the present invention.

In all figures, identical or functionally equivalent elements and devices are denoted by the same reference numerals, unless indicated otherwise. The numbering of method steps is used for the sake of clarity and is, in particular, not intended to imply a certain chronological sequence, unless indicated otherwise. In particular, multiple method steps may also be carried out simultaneously.

DETAILED DESCRIPTION OF EXAMPLE EMBODIMENTS

FIG. 1 shows a schematic block diagram of a radar sensor system according to one specific embodiment of the present invention.

As is apparent from FIG. 1, radar sensor system 100 includes at least one first sub-sensor system 10 and a second sub-sensor system 20, each for generating sensor data. Each sub-sensor system 10, 20 includes an antenna array 13, 23 including at least one respective receiving antenna and at least one respective transmitting antenna. FIG. 1 shows that first sub-sensor system 10 includes an antenna array 13, and that second sub-sensor system 20 includes an antenna array 23. It shall be understood that radar sensor system 100 may also include more than two sub-sensor systems 10, 20, for example, three, four, eight or even more sub-sensor systems 10, 20.

As will be described hereafter, in particular, symmetrical arrangements of antenna arrays 13, 23 of the individual sub-sensor systems 10, 20 with respect to one another are preferred. In this way, preferably even numbers, particularly preferably divisible by four, of sub-sensor systems 10, 20 are used, so that antenna arrays 13, 23 of sub-sensor systems 10, 20 may be situated with respect to one another according to one mirror symmetry or even two mirror symmetries.

Radar sensor system 100 furthermore includes a control device 50, by which each sub-sensor system 10, 20 is transferable from a normal operation into a silent operation independently of any other sub-sensor system 10, 20.

Control device 50 is also shown schematically in FIG. 1, in the form of a single block. In several particularly advantageous specific embodiments, control device 50 is made up of a multitude of individual control units, which are separated from one another and of which at least one is assigned to each sub-sensor system 10, 20. Such specific embodiments are described in greater detail hereafter by way of example with reference to FIG. 2.

Radar sensor system 100 furthermore includes a clock generator 60, which provides a shared clock signal 71 to sub-sensor systems 10, 20.

A data fusion device 30 of radar sensor system 100 is coupled to sub-sensor systems 10, 20 in such a way that the sensor data generated by the sub-sensor systems may be fused with one another for generating the output data of radar sensor system 100. Data fusion device 30 is designed and configured to fuse the sensor data with one another exclusively of those sub-sensor systems 10, 20 which are in the normal operation, i.e., which are presently not transferred into the silent operation.

If radar sensor system 100 is thus in the best case, i.e., in a state in which all sub-sensor systems 10, 20 function error free, the sensor data of all sub-sensor systems 10, 20 are fused with one another with the aid of data fusion device 30. If, however, radar sensor system 100 is in an emergency operation, i.e., if at least one sub-sensor system was transferred into the silent operation, the sensor data of sub-sensor systems 10, 20 transferred into the silent operation are not fused with the sensor data of the other sub-sensor systems 10, 20.

This may be achieved, for example, by a sub-sensor system 10, 20, which was transferred by control device 50 into the silent operation, no longer providing its sensor data to data fusion device 30. As an alternative or in addition, control device 50 may inform data fusion device 30 via all those sub-sensor systems which are presently transferred into the silent operation and/or which have ever been transferred into the silent operation. Data fusion device 30 may be designed in such a way that, during the generation of the output data, it does not take those sensor data which data fusion device 30 receives from sub-sensor systems 10, 20 indicated by control device 50 as having been transferred into the silent operation into consideration, i.e., in particular, for example, does not fuse these with other sensor data.

As a further alternative, it may be provided that each sub-sensor system 10, 20 which was transferred into the silent operation communicates this to data fusion device 30 itself, for example as part of the sensor data or as a status signal attached to the sensor data which are being transmitted to data fusion device 30. Data fusion device 30 may thus be designed in such a way that sensor data denoted in such a way are not taken into consideration by data fusion device 30.

Data fusion device 30 may be designed separately from sub-sensor systems 10, 20. In several advantageous specific embodiments, data fusion device 30, however, is designed and situated in a distributed manner and, in addition to a respective processing unit of a respective sub-sensor system 10, 20, also includes data lines between the individual sub-sensor systems 10, 20, preferably direct data links between the individual sub-sensor systems 10, 20.

It is also possible that data fusion device 30 is integrated into control device 50. Control device 50 may thus function as a central control device, with which sub-sensor systems 10, 20 are advantageously permanently in contact: control device 50 may transfer each sub-sensor system 10, 20 into the silent operation at any time. For this purpose, control device 50 advantageously receives data continuously, or at least regularly, for example the sensor data of the respective sub-sensor systems 10, 20, based on which control device 50 determines whether the respective sub-sensor system 10, 20 is able to remain in the normal operation, or whether it is transferred into the silent operation (or, conversely, whether a sub-sensor system 10, 20 transferred into the silent operation is transferred back into the normal operation).

The use of a separate, central component for several of sub-sensor systems 10, 20, or even for all of sub-sensor systems 10, 20, for data fusion device 30 results in the advantage that this central data fusion device may be efficiently designed with more computing power, by which overall space may be saved and, at the same time, the available computing power may be increased. Moreover, an interconnection complexity may be reduced in this way, since several or all of the direct data lines between sub-sensor systems 10, 20 may be dispensed with.

If a radar sensor system 100 is designed including four sub-sensor systems 10, 20, for example, and if each sub-sensor system 10, 20 is to be able to use direct data links with each of the other sub-sensor systems 10, 20, so that a processing unit of each sub-sensor system 10, 20 may in each case fuse its own sensor data with the sensor data of all other sub-sensor systems 10, 20 in the normal operation, a total of six direct data lines thus become necessary between sub-sensor systems 10, 20. In the case of N sub-sensor systems 10, 20, the number of necessary direct data links between all sub-sensor systems 10, 20 is thus accordingly $N*(N-1)/2$.

This is to be compared to the case in which all sub-sensor systems 10, 20 in each case only communicate with a central data fusion device 30. Only N data lines are required for this purpose, namely one between each sub-sensor system 10, 20 and data fusion device 30. In the case of N sub-sensor systems, thus only N data lines are required.

One advantage of specific embodiments including direct data lines between all sub-sensor systems 10, 20, however, is that these specific embodiments have a particularly high redundancy, and the one, central data fusion device 30 (which may be integrated into control device 50, but does not have to be) does not represent a shared error source.

As was already mentioned, a preferably permanent communication, however at least a regular communication, between the individual sub-sensor systems 10, 20 is desirable to be able to fuse the sensor data at a preferably low signal level, in particular, a raw data-near level.

Data fusion device 30 is, in particular, designed to fuse the sensor data generated by sub-sensor systems 10, 20 at a raw data level or at a spectra level. In other words, in particular, either the raw sensor data themselves may be fused (raw data level), or complex signals or spectra may be ascertained, which are then fused with one another (spectra level).

Ideally, the fusion takes place at the raw data level, which, however, necessitates a high performance of the data lines, for example using several Gbps or a lot of memory, these two approaches being comparatively complex. To reduce this complexity, a communication between sub-sensor systems 10, 20 of between one and 1000 Mbps, in particular, between 200 and 800 Mbps, particularly preferably between 300 and 700 Mbps, may advantageously be used to fuse the sensor data at one level before a subsequent angle estimation takes place.

In each sub-sensor system 10, 20, the entire data volume of all sub-sensor systems 10, 20 is advantageously mirrored in the normal operation, so that a high degree of redundancy also exists in this regard.

Antenna arrays 13, 23 of sub-sensor systems 10, 20 are particularly preferably situated with respect to one another according to at least a kind of symmetry. For example, in the case of two antenna arrays 13, 23, the antenna arrays may, in particular, be situated mirror-symmetrically with respect to an axis of mirror symmetry, for example as will be explained hereafter with reference to FIG. 2 and FIG. 3.

If, for example, four antenna arrays 13, 23 of the radar sensor system 100 are provided, an arrangement using two axes of mirror symmetry is advantageous, so that a high accuracy may be achieved in two spatial dimensions in the best case of the radar sensor system, and a high redundancy exists in the silent operation, to be able to compensate for failures (caused by sub-sensor systems transferred into the silent operation).

A point-symmetrical arrangement of several or all antenna arrays 13, 23 of sub-sensor systems 10, 20 may also be advantageous. However, arrangements of antenna arrays 13, 23 of sub-sensor systems 10, 20 with respect to one another which have no symmetry, but which are nested, for example, or have a pseudorandom arrangement, are also possible.

Figure 2:
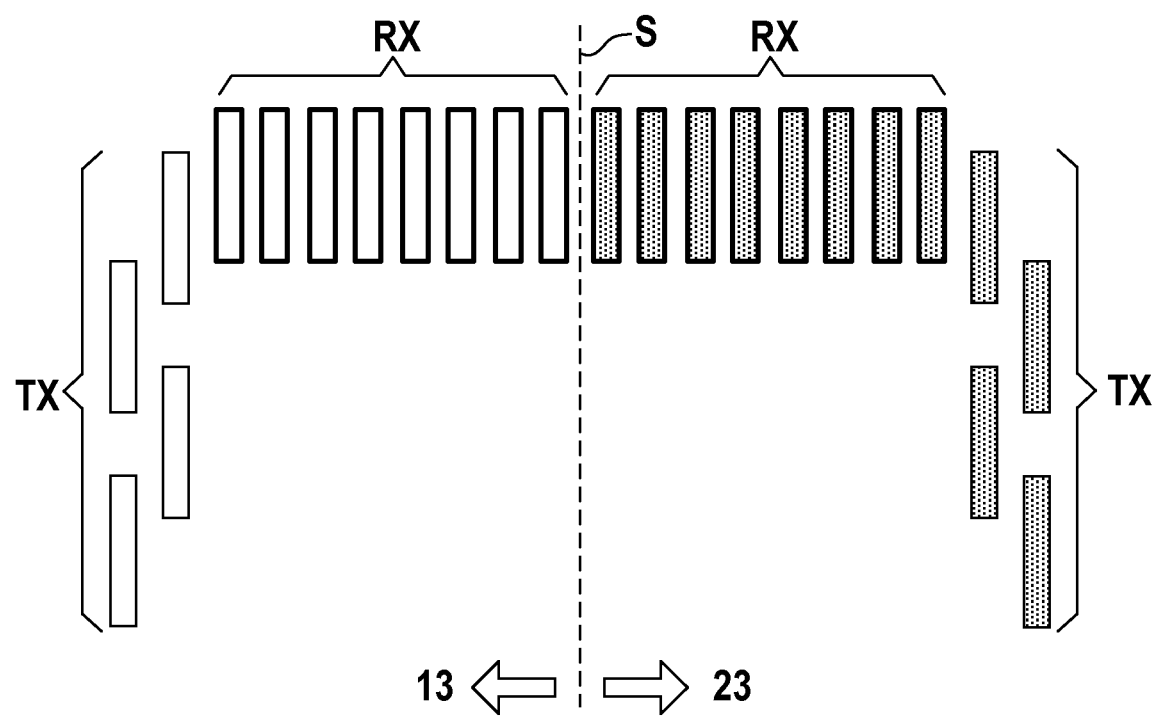
FIG. 2 schematically shows a detail of a radar sensor system according to one possible specific embodiment of the present invention.

FIG. 2 shows a detail of a radar sensor system 100 according to one possible specific embodiment of the present invention, first antenna array 13 of first sub-sensor system 10 being designed and situated mirror-symmetrically to second antenna array 23 of second sub-sensor system 20 with respect to an axis of mirror symmetry S. As is identified in FIG. 2, elements illustrated to the left of axis of mirror symmetry S are part of first antenna array 13 of first sub-sensor system 10, and elements illustrated to the right of axis of mirror symmetry S are part of second antenna array 23 of second sub-sensor system 20.

The arrangement (i.e., in particular, orientation and positioning) of antenna arrays 13, 23 with respect to one another is described hereafter based on one example, according to which these antenna arrays 13, 23 or radar sensor system 100 are designed as part of a vehicle. In FIG. 2, the horizontal direction (i.e., from left to right) is to correspond to the horizontal direction when driving a vehicle, and the vertical direction, i.e., from top to bottom in FIG. 2, is to correspond to a vertical direction when driving the vehicle, i.e., different heights above the roadway. In this way, distributed arrangements of receiving antennas and/or transmitting antennas in the horizontal direction are suitable for determining the so-called azimuth angle of objects with respect to the vehicle. An arrangement distribution of receiving antennas and/or transmitting antennas in the vertical direction, in contrast, is suitable for determining the so-called elevation angle of objects with respect to the vehicle particularly precisely.

As is furthermore illustrated in FIG. 2, each of these two antenna arrays 13, 23 includes multiple receiving antennas, collectively referred to as RX, and multiple transmitting antennas, collectively referred to as TX. Receiving antennas RX of both antenna arrays 13, 23 are advantageously situated in parallel to one another in a line, in the example in FIG. 2 in the horizontal direction. As was already mentioned, a particularly high resolution in the horizontal direction is provided in this way, i.e., the azimuth angle, with respect to the vehicle, of objects in the surroundings of the vehicle may be determined particularly precisely by radar sensor system 100. In the example shown in FIG. 2, first antenna array 13 includes eight receiving antennas RX, which are designed as column antennas, for example.

In addition to receiving antennas RX, first antenna array 13 furthermore includes four transmitting antennas TX which, according to FIG. 2, are also designed as column antennas, other forms of antennas also being possible. As is furthermore shown in FIG. 2, two of transmitting antennas TX in each case are advantageously oriented in such a way that they are situated in each case, along their column direction, collinearly with precisely one other transmitting antenna TX. The two pairs of collinearly situated transmitting antennas TX are shifted with respect to one another in the horizontal direction, as well as additionally also in the vertical direction. In other words, no two of the transmitting antennas are situated precisely identically in the vertical direction. Advantageously, it may be provided that two transmitting antennas TX adjoining in the vertical direction in each case partially overlap in the vertical direction. In this way, a particularly high resolution may be achieved in the vertical direction, so that the elevation angle of objects in the surroundings of the vehicle may be determined particularly precisely by radar sensor system 100. In other words, the elevation performance of the output data of radar sensor system 100 may be improved in this way.

As was already mentioned, first antenna array 13 and second antenna array 23 are designed and situated mirror-symmetrically to one another with respect to an axis of mirror symmetry S.

Transmitting antennas TX of each antenna array 13, 23 are in each case, in the horizontal direction, situated further away from axis of mirror symmetry S than the respective receiving antennas RX of the corresponding antenna array 13, 23. Receiving antennas RX of first antenna array 13 are not only situated in parallel to and in series with one another, but also with the equally situated receiving antennas RX of second antenna array 23, so that the radar sensor system according to FIG. 2 overall includes sixteen receiving antennas RX situated in parallel to one another in a row.

The respective receiving antennas TX are also advantageously situated in the vertical direction in such a way that none of transmitting antennas TX are situated, in the vertical direction, at the same level as any of receiving antennas RX. In this way, the resolution in the vertical direction, i.e., the elevation performance of the output data, may be further improved. It may be provided that in each case one of transmitting antennas TX of antenna arrays 13, 23, in the vertical direction, overlaps receiving antennas RX situated in parallel to one another, in particular, that a majority of the extension of the corresponding transmitting antenna TX, in the vertical direction, overlaps a majority of the extension of receiving antenna RX. It may furthermore be provided that transmitting antenna TX, which vertically adjoins transmitting antenna TX overlapping receiving antenna RX, is situated in such a way that it directly adjoins receiving antennas RX in the vertical direction, but is spaced apart therefrom in the horizontal direction.

It is clearly shown from the examples of FIG. 2 that, if one of the two sub-sensor systems 10, 20 is transferred from the normal operation into the silent operation, the respective remaining sub-sensor system 10, 20 makes it possible for the output data of the radar sensor system to be provided with unchanged resolution in the vertical direction, and with reduced resolution, for example cut in half, in the horizontal direction.

The specific embodiment shown in FIG. 2 is thus, in particular, suitable for radar sensor systems 100 in which in particular the elevation performance is also significant during the emergency operation of radar sensor system 100. Instead, the radar sensor system may also be designed including two sub-sensor systems 10, 20 whose antenna arrays 13, 23 are designed and situated mirror-symmetrically with respect to an axis of mirror symmetry S, this axis of mirror symmetry S extending in the horizontal direction. In this case, radar sensor system 100 would thus be particularly well-suited for providing a consistent azimuth performance, while the elevation performance would decrease during the emergency operation in accordance with the number of sub-sensor systems 10, 20 transferred into a silent operation.

It is apparent from what was stated above that a radar sensor system 100 including four or sixteen, or another number divisible by four of, sub-sensor systems 10, 20 is advantageous, since such a radar sensor system may include antenna arrays 13, 23 which are situated mirror-symmetrically to one another, both in the horizontal direction and in the vertical direction, or, expressed in more general terms, which are situated mirror-symmetrically to one another with respect to two axes of mirror symmetry S which are perpendicular to one another. Even if one sub-sensor system were to fail, both almost the full elevation performance as well as almost the full azimuth performance would still be achievable with such arrangements. In contrast, a radar sensor system 100 including only two sub-sensor systems 10, 20 has the advantage of smaller dimensioning and lesser costs.

The mirror-symmetrically identical, or at least largely similar, design of antenna arrays 13, 23 of the individual sub-sensor systems 10, 20 has the further advantage that, during the emergency operation of radar sensor system 100, i.e., when one or multiple sub-sensor system(s) 10, 20 are transferred into the silent operation, while other sub-sensor systems 10, 20 are still in the normal operation, the quality and/or further properties of the output data of radar sensor system 100 differ preferably little as a function of which sub-sensor system(s) 10, 20 exactly was/were transferred into the silent operation.

The specific embodiment described based on FIG. 2, for example, has the advantage that, regardless of which of sub-sensor systems 10, 20 fails, the same reduction in the azimuth performance and the same change (namely none) in the elevation performance take place in each case. The latter is due to the fact that, for each transmitting antenna TX of each of the two sub-sensor systems 10, 20 in FIG. 2, in each case there is at least one transmitting antenna TX of the other of the two sub-sensor systems 10, 20, which is situated at the same vertical height, and that, for each receiving antenna RX of each of the two sub-sensor systems 10, 20 in FIG. 2, in each case there is at least one receiving antenna RX of the other of the two sub-sensor systems 10, 20, which is situated at the same vertical height.

Figure 3:
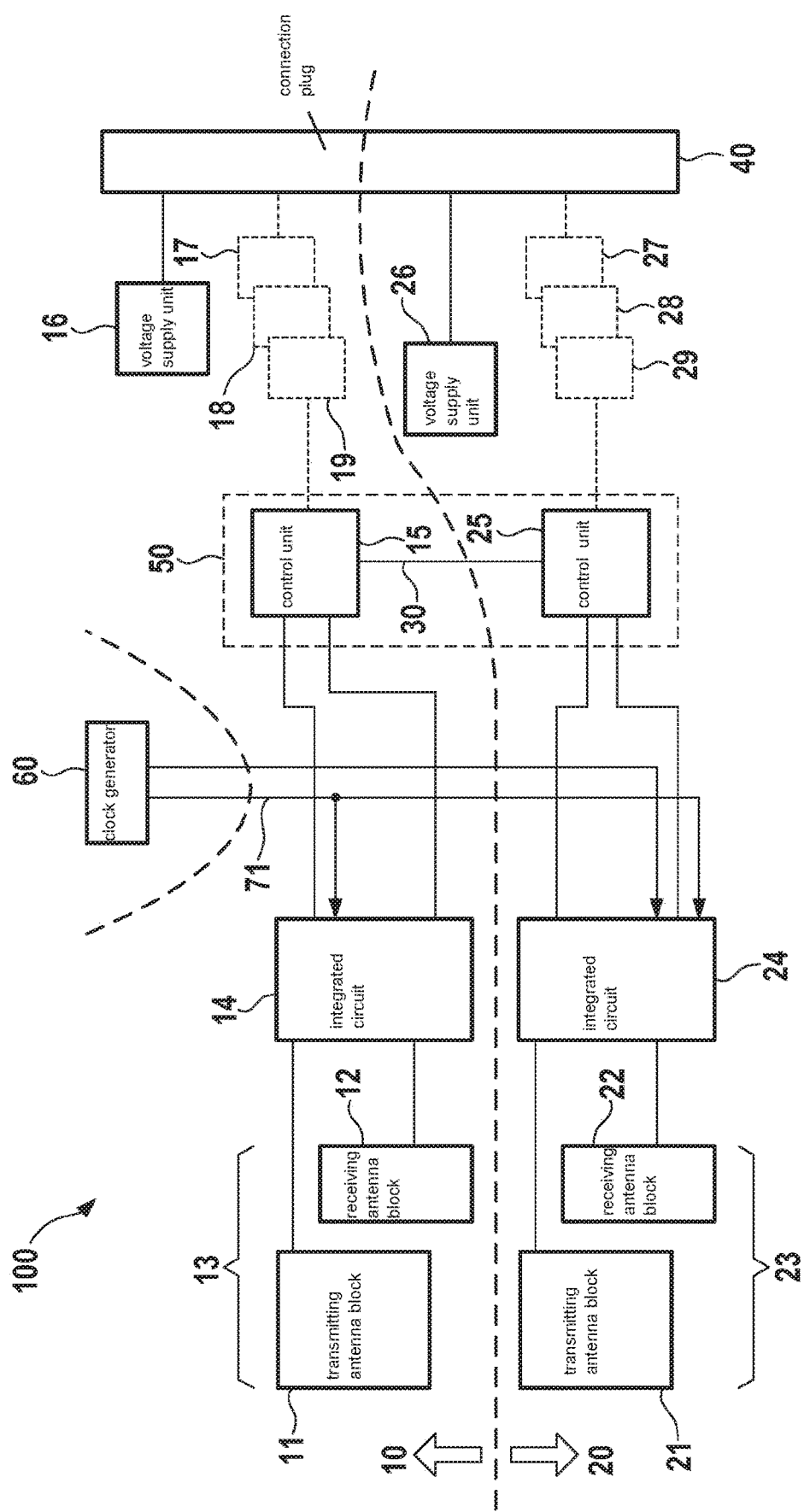
FIG. 3 shows a schematic block diagram of a possible specification of an electronics architecture of a radar sensor system according to FIG. 1 and/or FIG. 2.

FIG. 3 shows a schematic block diagram of a possible specification of an electronics architecture of a radar sensor system 100 according to FIG. 1 and FIG. 2.

The separation of radar sensor system 100 into two sub-sensor systems 10, 20 separate from one another is indicated in FIG. 3 as an essentially horizontally extending, dotted curve. Elements above this curve are considered part of first sub-sensor system 10, or are designed as part of first sub-sensor system 10. Elements beneath this curve are assigned to second sub-sensor system 20, or are designed as part of second sub-sensor system 20.

The transmitting antennas denoted collectively as TX in FIG. 2 are combined into blocks of four transmitting antennas in each case in the electronics architecture according to FIG. 3 and denoted by 11 and 21. Transmitting antenna block 11 of first antenna array 13 is assigned to first sub-sensor system 10 and designed as part thereof. Transmitting antenna block 21 of second antenna array 23 is assigned to second sub-sensor system 20 and designed as part thereof. It shall be understood that antenna arrays 13, 23 may also each include multiple transmitting antenna blocks, and/or having different numbers of transmitting antennas TX, for example transmitting antenna blocks having two transmitting antennas in each case, and the like.

The receiving antennas denoted collectively as RX in FIG. 2 are combined into blocks of eight receiving antennas in each case in the electronics architecture according to FIG. 3 and denoted by 12 and 22. Receiving antenna block 12 of first antenna array 13 is assigned to first sub-sensor system 10 and designed as part thereof. Receiving antenna block 22 of second antenna array 23 is assigned to second sub-sensor system 20 and designed as part thereof. It shall be understood that antenna arrays 13, 23 also may each include multiple receiving antenna blocks, and/or having different numbers of receiving antennas RX, for example transmitting antenna blocks having four transmitting antennas in each case, or having two receiving antennas in each case, or the like.

One of transmitting antenna blocks 11 and one of receiving antenna blocks 12 are in each case together assigned to a respective integrated circuit 14, 24 and/or designed as part of this integrated circuit 14, 24.

Integrated circuits 14, 24 may, in particular, be monolithic microwave integrated circuits (MMICS). In contrast, the electronic system for all transmitting antennas and receiving antennas is integrated, for this purpose, on a single integrated circuit for cost reasons in many conventional radar sensor systems, so that, in the fault case of this integrated circuit, all transmitting antennas and all receiving antennas are covered by a silent operation.

For example, RF modules including signal generation, transmitters, receivers having a baseband chain and/or analog-to-digital converters and the like may advantageously be integrated into integrated circuits 14, 24. The combination of transmitting and receiving antenna blocks 11, 21, each including the associated integrated circuit 14, 24, may also be referred to as radar front end.

It is also explained in FIG. 3 how clock generator 60, which was already explained with respect to FIG. 1, provides shared clock signal 71 to integrated circuits 14, 24.

In the specific embodiment shown in FIG. 3, which is one variant of the specific embodiment described according to FIG. 1, control device 50 includes a multitude of control units 15, 25, at least one of control units 15, 25 being assigned to each sub-sensor system for transferring the respective sub-sensor system 10, 20 into the silent operation. As is illustrated based on FIG. 3, a first control unit 15 is advantageously assigned to first sub-sensor system 10, in particular, designed as part thereof, and a second control unit 25 is assigned to second sub-sensor system 20, in particular, designed as part thereof.

Control units 15, 25 are preferably designed as microcontrollers. As an alternative or in addition, however, control units 15, 25 may also application specific integrated circuits, FPGA or the like, or be designed as such.

As is furthermore illustrated based on FIG. 3, data fusion device 30 includes a direct data interface between control units 15, 25, which is used to exchange the sensor data of the individual sub-sensor systems 10, 20 for their fusion. Each of control units 15, 25 is supplied with a supply voltage via a respective voltage supply unit 16, 26. The individual voltage supply units 16, 26 may optionally be connected with the aid of at least one (preferably exactly one) connection plug 40 to a shared bus system, for example to a vehicle bus system, such as the frequently used CAN bus.

The fusion of the sensor data advantageously takes place in both (or in all, if more than two sub-sensor systems 10, 20 are provided) control units 15, 25, so that in the best case, when both sub-sensor systems 10, 20 function error free, each of control units 15, 25 is able to generate and output the same output data in terms of content. In other words, a complete mirroring may be present within each of control units 15, 25.

In the case that one of the two sub-sensor systems 10, 20 is transferred into the silent operation, its sensor data are no longer used for the fusion of the sensor data; in the case described based on FIG. 3, including exactly two sub-sensor systems 10, 20, no fusion of sensor data thus takes place any longer, and only the sensor data of sub-sensor system 10, 20 not transferred into the silent operation are used as output data and/or further processed.

FIG. 3 also illustrates that control units 15, 25 are able to output the output data via different systems, for example also to the shared bus system. This may take place, for example, via CAN interfaces, Ethernet interfaces 18, 28 and/or Flexray interfaces 19, 29.

As an alternative to the case shown by way of example in FIG. 3, including exactly one connection plug 40, it is also possible for multiple connection plugs, namely, in particular, in each case at least one connection plug per sub-sensor system 10, 20, to be provided.

Figure 4:
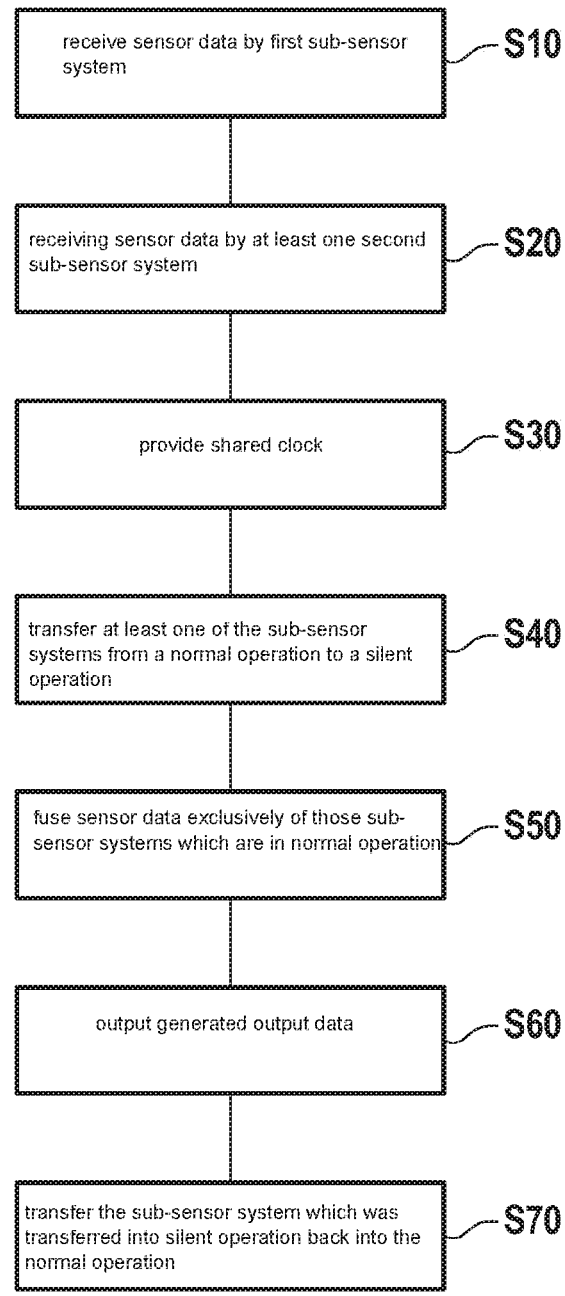
FIG. 4 shows a schematic flow chart to explain a method for operating a radar sensor system according to one further specific embodiment of the present invention.

FIG. 4 shows a schematic flow chart to explain a method for operating a radar sensor system according to one further specific embodiment of the present invention. The system according to FIG. 4 is, in particular, usable for operating radar sensor system 100. In this way, the method explained based on FIG. 4 may be adapted according to all modifications and refinements explained above with respect to radar sensor system 100, and vice versa.

Any reference in the following description of the method according to the present invention is of a descriptive nature, and does not necessarily mean that the method is limited to the use of exactly this component. Whenever reference numerals of the preceding FIGS. 1 through 3 are mentioned hereafter, it shall also be understood that this primarily serves the explanation and is not intended to mean that the method is limited to the use of exactly these elements.

In a step S10, sensor data are received by a first sub-sensor system 10 of a radar sensor system 100, first sub-sensor system 10 including an antenna array 13 including at least one receiving antenna RX and at least one transmitting antenna TX.

In a step S20, sensor data are received by at least one second sub-sensor system 20 of radar sensor system 100, second sub-sensor system 20 including a dedicated second antenna array 23 including at least one receiving antenna RX and at least one transmitting antenna TX. First and second sub-sensor systems 10, 20 may advantageously be designed in such a way, in particular, as far as the arrangement and design of antenna arrays 13, 23 is concerned, as was described above with reference to FIGS. 1 through 3. Steps S10 and S20 may, in particular, take place concurrently, if necessary also concurrently with further of the explained method steps.

In a step S30, a shared clock signal 71 is provided to sub-sensor systems 10, 20, for example as described above with respect to clock generator 60. The provision S30 of clock signal 71 preferably takes place regularly, continuously and/or over an extended time period.

In a step S40, at least one of sub-sensor systems 10, 20 is transferred from a normal operation into a silent operation independently of the other sub-sensor systems 10, 20, in particular, as was described above with respect to control device 50.

In a step S50, the sensor data exclusively of those sub-sensor systems 10, 20 which are in the normal operation are fused with one another for generating output data, in particular as was described above with respect to data fusion device 30.

In a step S60, the generated output data are output, for example to a connection plug 40, as was described above, for example to a connection plug 40 designed for the connection to a vehicle. The generated output data may also be output in another manner to a vehicle, such as wirelessly.

It shall be understood that the described method is not limited to radar sensor systems including exactly two sub-sensor systems 10, 20, but may be applied just as well to radar sensor systems 100 including more than two sub-sensor systems 10, 20, as was also already described in detail above.

The method preferably also includes a step S70, in which at least one sub-sensor system 10, 20, which was transferred into the silent operation, is transferred back into the normal operation. Steps S40 of transferring into the silent operation and S70 of transferring into the normal operation may each be part of sub-steps, in which sensor data of sub-sensor systems 10, 20 are evaluated, and it is determined, based on the sensor data, whether the respective sub-sensor system 10, 20 is to be transferred into the normal operation, to continue to be operated in the normal operation, to be transferred into the silent operation the silent operation.

Although the present invention has been described above based on preferred exemplary embodiments, it is not limited thereto, but is modifiable in a variety of ways. The present invention may in particular be changed or modified in multiple ways without departing from the core of the present invention.

What is claimed is:

1. A radar sensor system, comprising:
a clock generator to provide a shared clock signal;
a plurality of sub-sensor systems including at least one first sub-sensor system and a second sub-sensor system, each of the sub-sensor systems being configured to generate sensor data, each of sub-sensor systems including an antenna array, the antenna array including at least one receiving antenna and at least one transmitting antenna;
a control device, by which each of the sub-sensor systems is independently transferrable from a normal operation into a silent operation; and
a data fusion device configured to fuse the sensor data, using only the sub-sensor systems in the normal operation, with one another for generating output data;
wherein the first sub-sensor system is coupled to the control device and to the data fusion device, and wherein the second sub-sensor system is coupled to the control device and to the data fusion device, and wherein the first sub-sensor system and the second sub-sensor system are each coupled to the clock generator to receive the shared clock signal,
wherein when the radar sensor system is in a state in which all of sub-sensor systems function error free, the sensor data of all sub-sensor systems are fused with one another with the data fusion device, and wherein when at least one of the sub-sensor systems is transferred into the silent operation, the sensor data of sub-sensor systems transferred into the silent operation are not fused with the sensor data of the other sub-sensor systems, and
wherein a plurality of the antenna arrays are situated mirror-symmetrically with respect to at least two axes of mirror symmetry, so that improved accuracy is achieved in at least two spatial dimensions in the radar sensor system, and redundancy exists for compensating for a failure.

2. The radar sensor system as recited in claim 1, wherein the data fusion device is configured to fuse the sensor data generated by the sub-sensor systems, at a raw data level.

3. The radar sensor system as recited in claim 1, wherein the data fusion device is configured to fuse the sensor data generated by the sub-sensor systems at a raw data level or at a spectra level.

4. The radar sensor system as recited in claim 1, wherein the control device includes a multitude of control units, at least one of the control units being assigned to each of sub-sensor systems for transferring the respective sub-sensor system into the silent operation.

5. The radar sensor system as recited in claim 4, wherein the control units are microcontrollers.

6. The radar sensor system as recited in claim 4, wherein the data fusion device includes a data interface between at least two of the multitude of control units.

7. The radar sensor system as recited in claim 1, wherein the control device includes a central control unit for at least two of the sub-sensor systems or is made up of a central control unit for all of the sub-sensor systems.

8. The radar sensor system as recited in claim 1, wherein the antenna arrays of at least two of the sub-sensor systems are situated point-symmetrically and/or axially symmetrically and/or rotation-symmetrically with respect to one another.

9. The radar sensor system as recited in claim 1, wherein each of the sub-sensor systems includes a dedicated independent voltage supply unit, which is feedable electrical energy via a shared plug connector of the radar sensor system.

10. A method for operating a radar sensor system, the method comprising:
receiving sensor data of a first sub-sensor system of a plurality of sub-sensor systems of a radar sensor system;
receiving sensor data of a second sub-sensor system the plurality of sub-sensor systems of the radar sensor system;
providing, via a clock generator, a shared clock signal to the sub-sensor systems;
transferring at least one of the sub-sensor systems from a normal operation into a silent operation, independently of the other sub-sensor systems;
fusing, via a fusion device, the sensor data using only those sub-sensor systems which are in the normal operation, using the shared clock signal, for generating output data; and
outputting the generated output data;
wherein the first sub-sensor system is coupled to the control device and to the data fusion device, and wherein the second sub-sensor system is coupled to the control device and to the data fusion device, and wherein the first sub-sensor system and the second sub-sensor system are each coupled to the clock generator to receive the shared clock signal,
wherein when the radar sensor system is in a state in which all of sub-sensor systems function error free, the sensor data of all sub-sensor systems are fused with one another with the data fusion device, and wherein when at least one of the sub-sensor systems is transferred into the silent operation, the sensor data of sub-sensor systems transferred into the silent operation are not fused with the sensor data of the other sub-sensor systems, and
wherein a plurality of the antenna arrays are situated mirror-symmetrically with respect to at least two axes of mirror symmetry, so that improved accuracy is achieved in at least two spatial dimensions in the radar sensor system, and redundancy exists for compensating for a failure.

* * * * *